US009132696B2

(12) United States Patent
Grengs (10) Patent No.: US 9,132,696 B2
(45) Date of Patent: Sep. 15, 2015

(54) TIRE MANIPULATION SYSTEM (71) Applicant: GLG Farms LLC, Sherwood, ND (US)

(72) Inventor: Greg L. Grengs, Sherwood, ND (US)

(73) Assignee: GLG Farms LLC, Sherwood, ND (US)

( * ) Notice: Subject to any disclaimer, the term of this patent is extended or adjusted under 35 U.S.C. 154(b) by 0 days.

(21) Appl. No.: 14/619,614

(22) Filed: Feb. 11, 2015

(65) Prior Publication Data

US 2015/0151576 A1    Jun. 4, 2015

(51) Int. Cl.
*B60B 29/00* (2006.01)
*B60B 30/02* (2006.01)

(52) U.S. Cl.
CPC ............. *B60B 29/001* (2013.01); *B60B 29/002* (2013.01); *B60B 30/02* (2013.01); *Y10S 414/124* (2013.01)

(58) Field of Classification Search
CPC  B60B 29/002; B62B 2202/031; B66C 1/485; B66F 9/183; B66F 9/184; Y10S 414/124; E02F 3/3645; E02F 3/3681; E02F 3/3686
USPC ............ 414/11, 23, 24.5, 426, 429, 620, 621, 414/684, 732, 741
See application file for complete search history.

(56) References Cited

U.S. PATENT DOCUMENTS

| | | | | |
|---|---|---|---|---|
| 3,262,595 | A * | 7/1966 | Seip, Jr. et al. | 414/621 |
| 3,830,388 | A | 8/1974 | Mott | |
| 3,927,778 | A | 12/1975 | Zrostlik | |
| 3,970,342 | A | 7/1976 | Cotton | |
| 4,051,966 | A * | 10/1977 | Cotton | 414/428 |
| 4,556,359 | A * | 12/1985 | Sinclair | 414/621 |
| 5,083,895 | A * | 1/1992 | McBirnie | 414/739 |
| 5,098,252 | A * | 3/1992 | Sheesley et al. | 414/723 |
| 6,435,805 | B1 | 8/2002 | Smith | |
| 6,499,934 | B1 * | 12/2002 | Kaczmarski et al. | 414/723 |
| 6,655,899 | B1 * | 12/2003 | Emerson | 414/729 |
| 7,452,176 | B2 * | 11/2008 | Priepke | 414/621 |
| 7,635,134 | B2 | 12/2009 | Hedley | |
| 8,137,044 | B2 | 3/2012 | Slee | |
| 8,459,926 | B2 | 6/2013 | Hedley | |
| 8,801,355 | B2 * | 8/2014 | Price | 414/723 |
| 2003/0031547 | A1 * | 2/2003 | Stumvoll et al. | 414/723 |
| 2007/0110553 | A1 * | 5/2007 | Neal et al. | 414/741 |
| 2007/0122262 | A1 * | 5/2007 | Daniel | 414/741 |
| 2008/0181756 | A1 * | 7/2008 | Moffitt | 414/729 |
| 2010/0166531 | A1 | 7/2010 | Bauer | |
| 2010/0172729 | A1 * | 7/2010 | Marcelli et al. | 414/684 |
| 2011/0274527 | A1 * | 11/2011 | Cavirani et al. | 414/620 |
| 2013/0047908 | A1 * | 2/2013 | Baten et al. | 114/268 |
| 2014/0138502 | A1 * | 5/2014 | Hall | 248/205.1 |

FOREIGN PATENT DOCUMENTS

WO    WO 83/03629 A1 * 10/1983 ............ 414/723

* cited by examiner

*Primary Examiner* — James Keenan
(74) *Attorney, Agent, or Firm* — Michael S. Neustel (57) ABSTRACT A tire manipulation system for efficiently manipulating the position of a tire. The tire manipulation system generally includes a mounting device for removable attachment to a tractor, a telescoping main support structure attached to the mounting device, a main actuator connected to the main support structure, a pivot axle rotatably connected to the main support structure, a support frame connected to the pivot axle, and a pair of telescoping supports each having an actuator and a gripping member for engaging a tire to be manipulated. The gripping members first engage the perimeter of a tire to be manipulated and then using the loader system of the tractor the user is able to manipulate the attitude of the tire.

18 Claims, 14 Drawing Sheets

TIRE MANIPULATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a tire manipulator and more specifically it relates to a tire manipulation system for efficiently manipulating the position of a tire.

2. Description of the Related Art

Any discussion of the related art throughout the specification should in no way be considered as an admission that such related art is widely known or forms part of common general knowledge in the field.

Tires for vehicles can be difficult to remove from a vehicle, move to a different location and install on a vehicle because of their weight and size. For example, two or more workers are typically required to remove, move and install a tire for a tractor which can easily weigh 500 pounds or more. In addition, the tires may have a large diameter of 6 feet or more making it difficult for workers to handle the cumbersome tire. To remove, move, repair and install a large tire, workers will connect a tractor loader or a hoist to the tire with straps/chains thereby allowing them to lift the tire. However, another worker must assist in the connection of the straps/chains and also guide the tire during movement. Because of the significant manual labor involved in manipulating large tires, it is very time consuming and expensive to change/repair a damaged tire on a vehicle.

Because of the inherent problems with the related art, there is a need for a new and improved tire manipulation system for efficiently manipulating the position of a tire.

BRIEF SUMMARY OF THE INVENTION

The invention generally relates to a tire manipulator which includes a mounting device for removable attachment to a tractor, a telescoping main support structure attached to the mounting device, a main actuator connected to the main support structure, a pivot axle rotatably connected to the main support structure, a support frame connected to the pivot axle, and a pair of telescoping supports each having an actuator and a gripping member for engaging a tire to be manipulated. The gripping members first engage the perimeter of a tire to be manipulated and then using the loader system of the tractor, the user is able to manipulate the attitude of the tire.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 13 illustrate a tire manipulation system 10, which comprises a mounting device 20 for removable attachment to a tractor 12, a telescoping main support structure 30 attached to the mounting device 20, a main actuator 38 connected to the main support structure 30, a pivot axle 40 rotatably connected to the main support structure 30, a support frame 50 connected to the pivot axle 40, and a pair of telescoping supports each having an actuator and a gripping member for engaging a tire 11 to be manipulated. The gripping members 64, 74 first engage the perimeter of a tire 11 to be manipulated and then using the loader system of the tractor 12 the user is able to manipulate the attitude of the tire 11.

The present invention may be attached to various types of tractors 12 including, but not limited to, skid steer tractors (a.k.a. skid-steer loaders), conventional wheeled tractors, conventional tracked tractors and the like. It is preferable that the invention is adapted for attachment to a skid steer tractor 12 which provides increased mobility when handling the tire 11. U.S. Patent Publication No. 2006/0120848 filed by Troy Guhr illustrates an exemplary skid steer vehicle which is incorporated by reference herein. In addition, the vertical adjustment of the main support structure 30 allows for the loader arms 14 of a skid steer tractor 12 to be lowered sufficiently when supporting a tire 11 to allow the operator of the skid steer tractor 12 to open the front door to work on the tire 11 without the need of a second person outside of the skid steer tractor 12.

B. Mounting Device.

The mounting device 20 is adapted for removable attachment to a tractor 12. The mounting device 20 is constructed of a configuration that is capable of being quickly connected and disconnected from the loader arms 14 of a tractor 12. The mounting device 20 is further preferably comprised of a quick attach mounting plate adapted for connecting to a quick attach connector on the loader arms 14 of a skid steer tractor 12 as illustrated in FIGS. 1a through 5 of the drawings. Various other structures and connections may be used for the mounting device 20 to connect the present invention to the loader arms 14 of a tractor 12. The loader arms 14 of the tractor 12 are used to lift/lower the present invention and to adjust the pitch of the present invention on the pitch axis (i.e. pitch forwardly or pitch rearwardly).

C. Main Support Structure.

Figure 8:
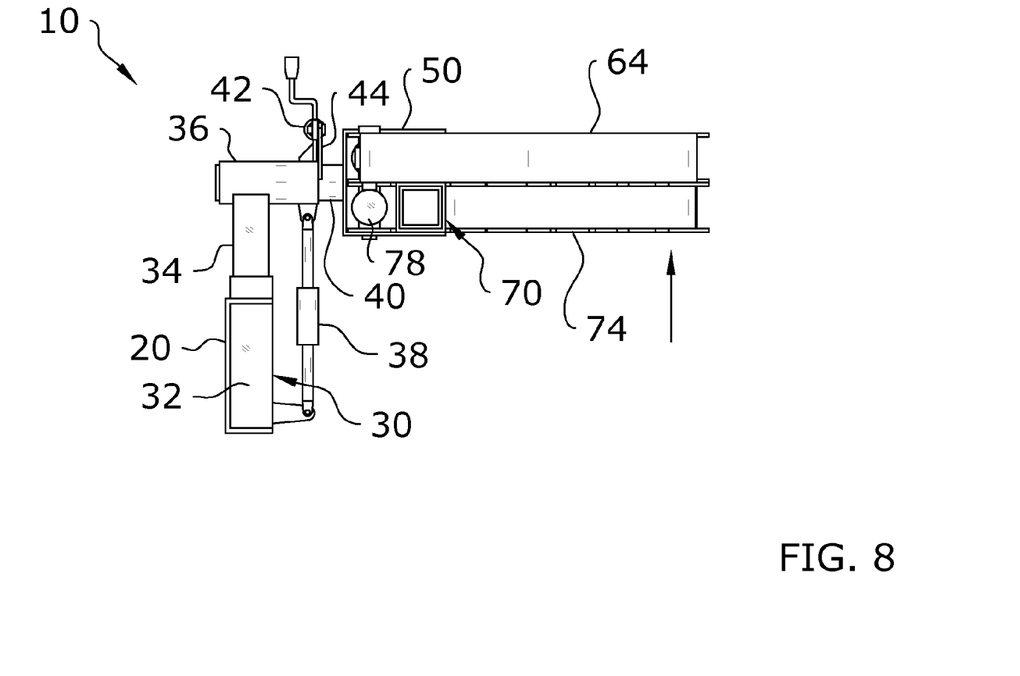
FIG. 8 is a right side view of the present invention with the gripping members being lifted upwardly by the main actuator.

The main support structure 30 is attached to the mounting device 20. The main support structure 30 is preferably adjustable in length to allow for adjustment of the distance of the support frame 50 from the mounting device 20. The further the support frame 50 is positioned away from the mounting device 20 the lower the height the loader arms 14 on the tractor 12 need to be to support a tire 11 in a desired mounting position on a vehicle thereby allowing the front door of a skid steer tractor 12 to be opened while mounting or dismounting a tire 11. FIG. 8 illustrates the main support structure 30 extended upwardly to lift the position of the gripping members 64, 74.

Figure 2:
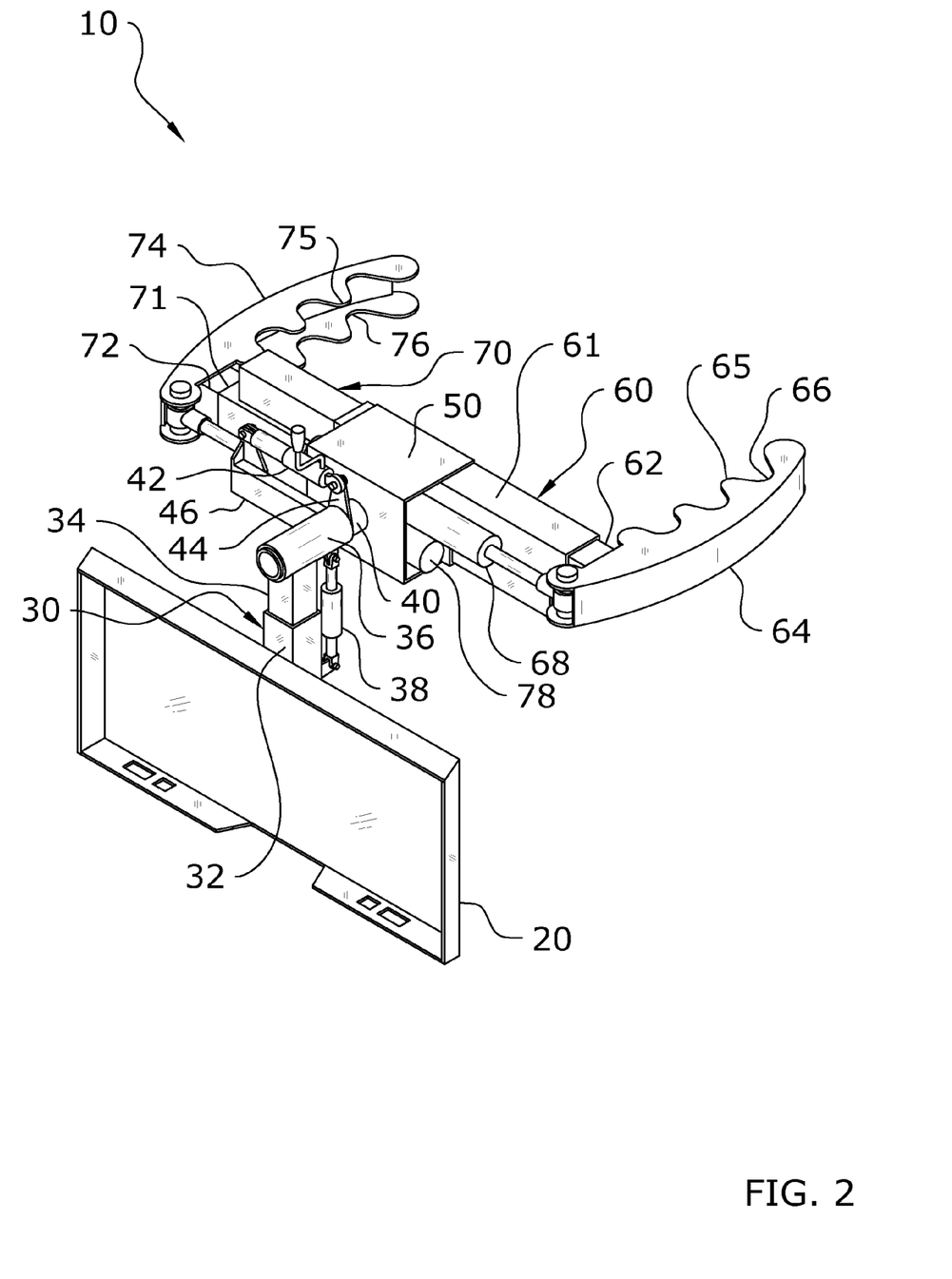
FIG. 2 is a rear upper perspective view of the present invention.
Figure 3:
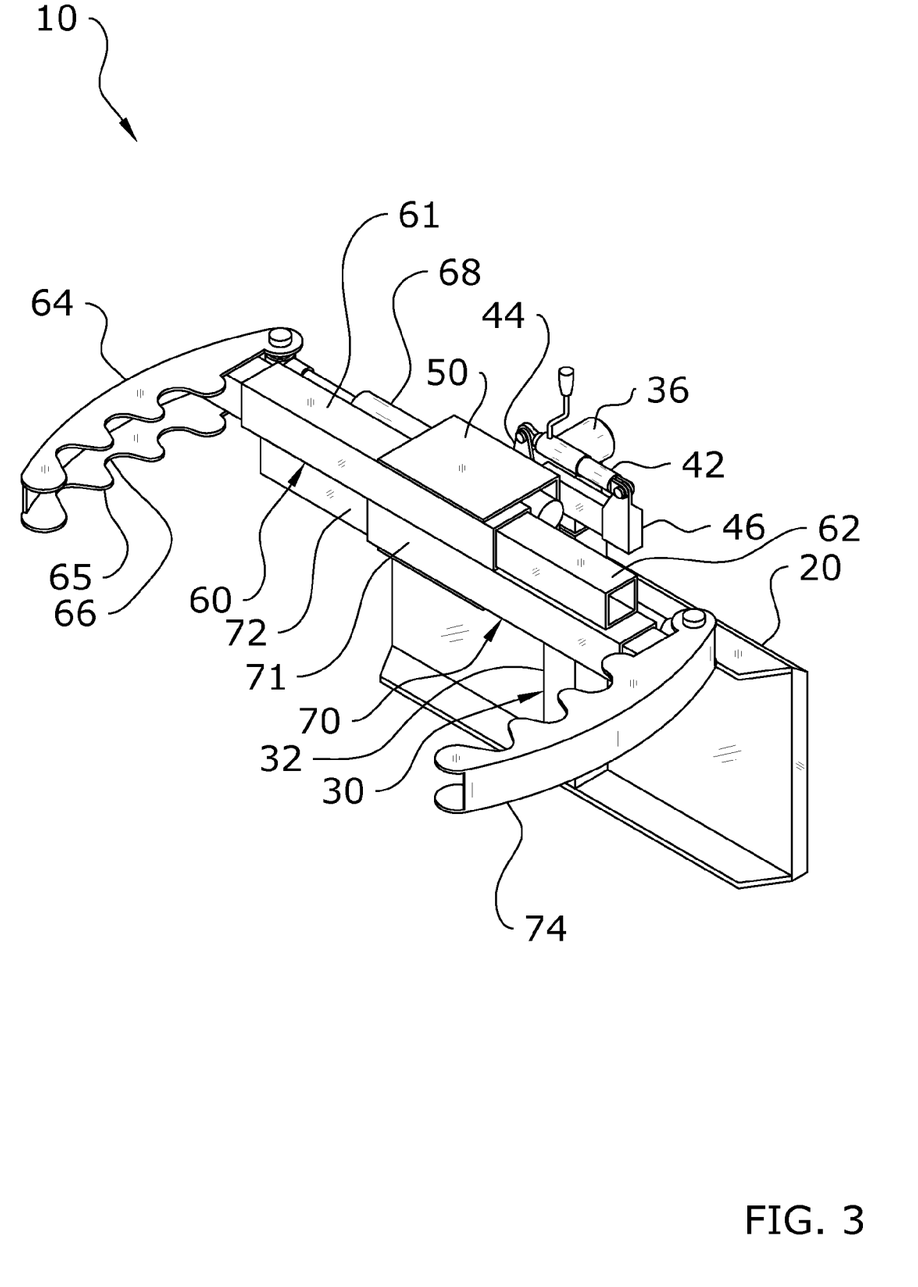
FIG. 3 is a front upper perspective view of the present invention.
Figure 4:
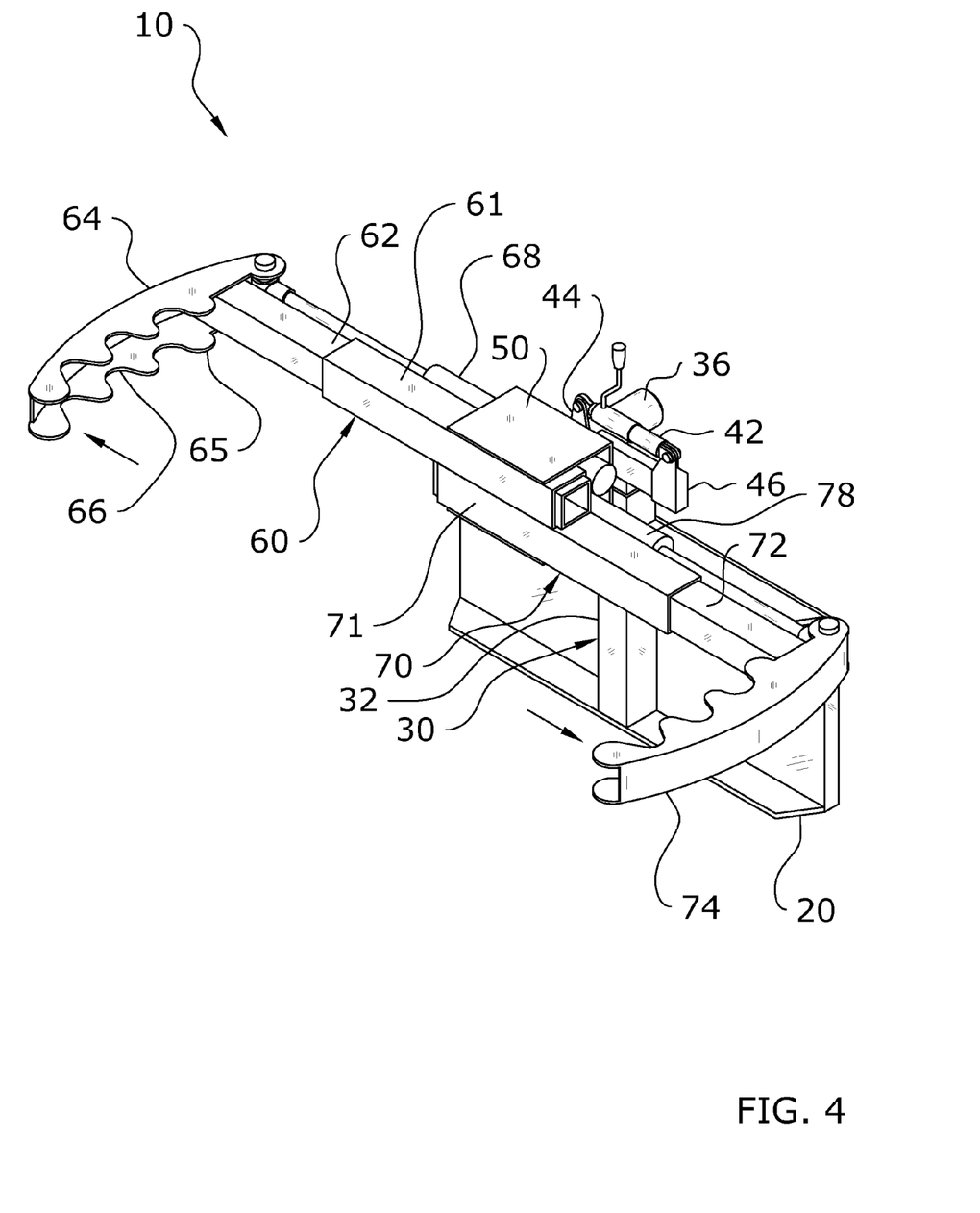
FIG. 4 is a front upper perspective view with the gripping members extended outwardly.
Figure 5:
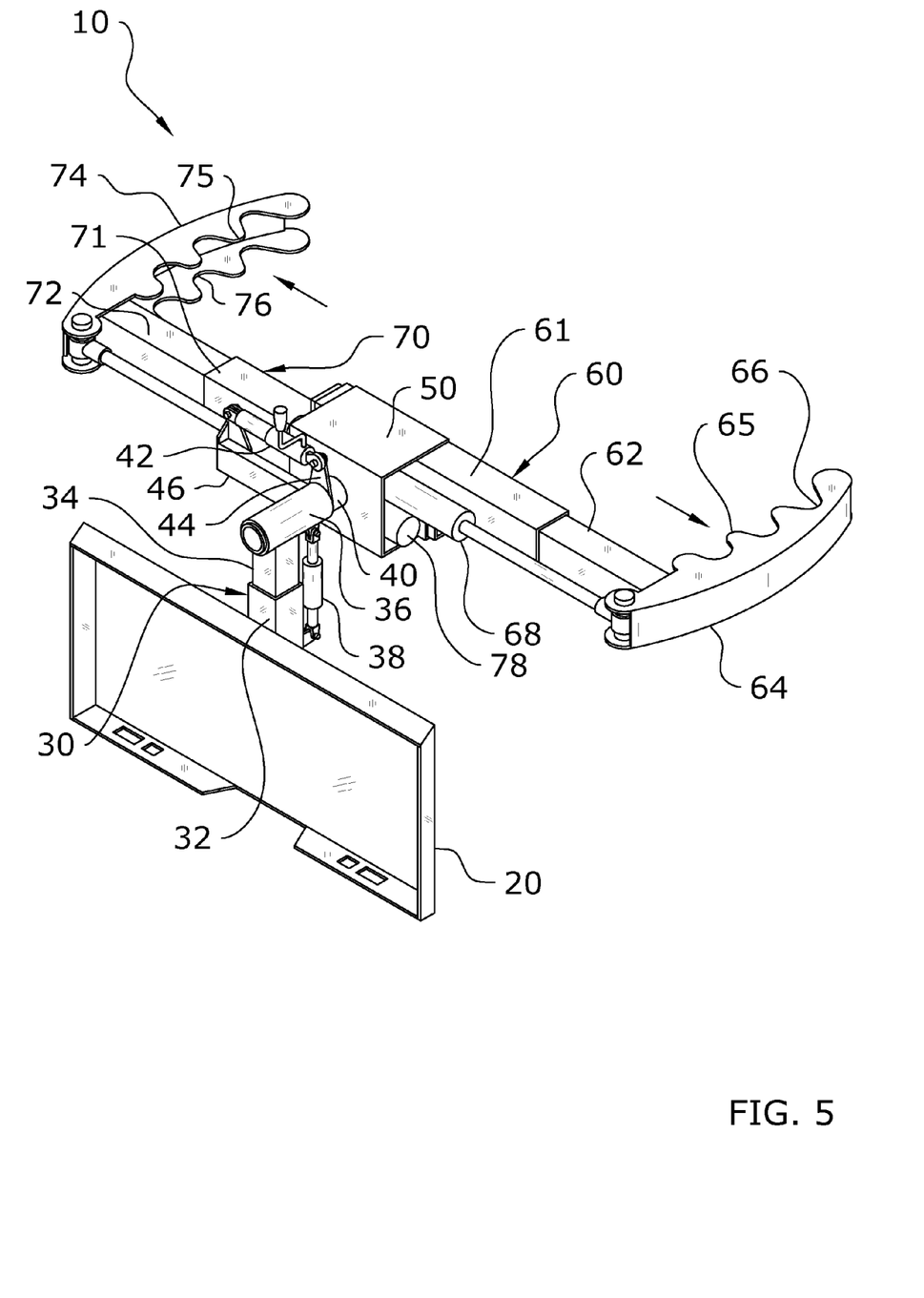
FIG. 5 is a rear upper perspective view with the gripping members extended outwardly.

The main support structure 30 is preferably comprised of a telescopic structure for lowering and raising the pivot axle 40 which pivotally supports the support frame 50. The main support structure 30 includes a lower support 32 vertically attached to the mounting device 20 and an upper support 34 slidably connected to the lower support 32. The upper support 34 is extended and retracted with respect to the lower support 32 to adjust the distance the support frame 50 is away from the mounting device 20. The lower support 32 is stationary with respect to the mounting device 20. The pivot axle 40 is rotatably connected to the upper end of the upper support 34 opposite of the mounting device 20. A pivot support 36 is attached to the upper support 34 for rotatably supporting the pivot axle 40 as illustrated in FIGS. 2 and 5 of the drawings.

Figure 7:
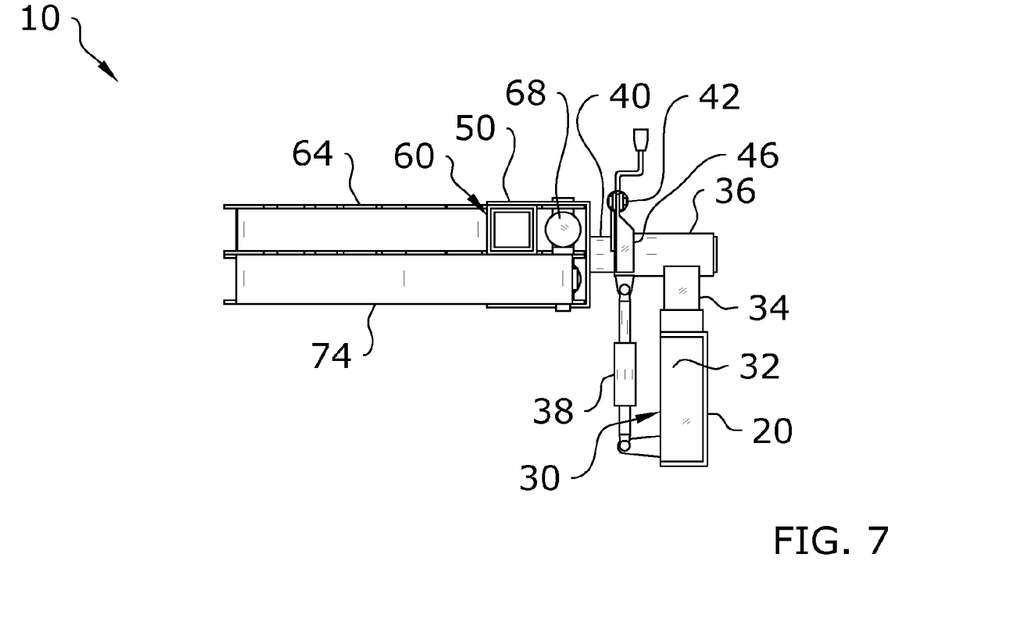
FIG. 7 is a left side view of the present invention.

A main actuator 38 is connected to the main support structure 30 to extend or retract the main support structure 30. The main actuator 38 is preferably connected between the lower support 32 and the upper support 34 as best illustrated in FIGS. 7 and 8 of the drawings. The main actuator 38 may be comprised of any type of linear actuator such as, but not limited to, mechanical actuators, hydraulic actuators, electro-mechanical actuators and the like.

D. Pivot Structure.

Figure 11:
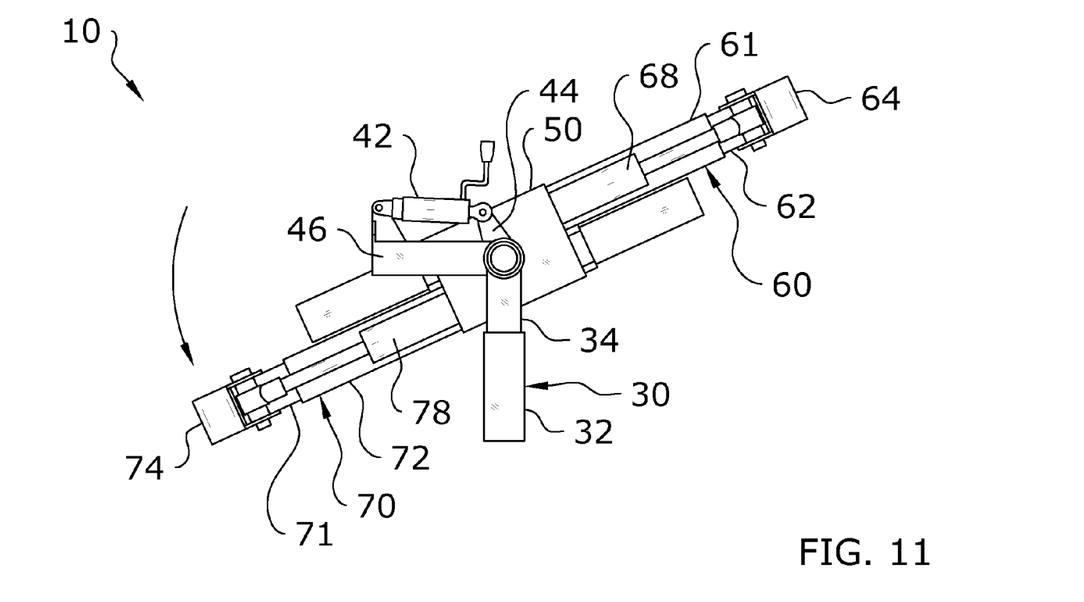
FIG. 11 is a rear view of the present invention with the gripping members rotated counterclockwise.
Figure 12:
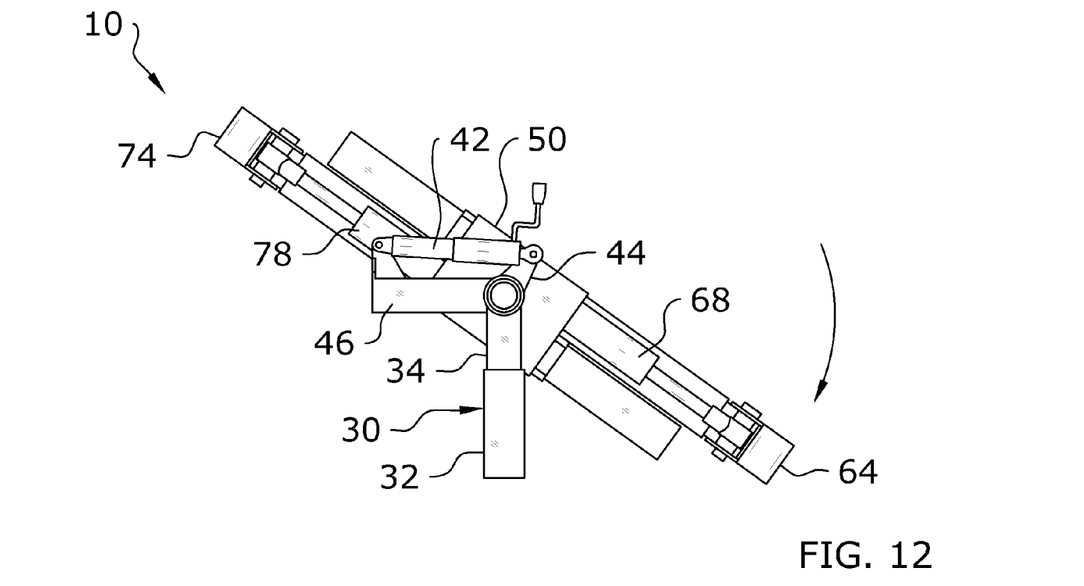
FIG. 12 is a rear view of the present invention with the gripping members rotated clockwise.

The pivot axle 40 is rotatably connected to the upper end of the main support structure 30 as discussed previously and as shown in FIGS. 2 and 5 of the drawings. The pivot axle 40 rotatably supports the support frame 50 relative to the main support structure 30. The pivot axle 40 may be comprised of any central shaft structure that is rotatably positioned within the pivot support 36. The pivot support 36 is preferably a tubular structure with the pivot axle 40 rotatably extending through the pivot support 36. The pivot axle 40 allows for sufficient rotation of the support frame 50 such that the tire 11 may be rotated clockwise or counterclockwise as illustrated in FIGS. 11 and 12 of the drawings. The pivot axle 40 preferably has a pivot axis that is substantially perpendicular to the mounting device 20 and perpendicular to the forward motion of the tractor 12.

A pivot actuator 42 is connected to the pivot axle 40, wherein the pivot actuator 42 rotates the pivot axle 40 with respect to the main support structure 30 and the pivot support 36. A pivot frame 46 extends from the main support structure 30 and a pivot arm 44 is connected to the pivot axle 40 as best illustrated in FIGS. 11 and 12 of the drawings. The pivot actuator 42 is connected between the pivot frame 46 and the pivot arm 44 as further shown in FIGS. 11 and 12. The pivot actuator 42 may be comprised of any type of linear actuator such as, but not limited to, mechanical actuators, hydraulic actuators, electro-mechanical actuators and the like. The pivot actuator 42 may also be comprised of a non-linear actuator such as a conventional electric motor or hydraulic motor. The pivot structure may alternatively not include an actuator and instead the user simply manually manipulates the rotational position of the support frame 50.

E. Support Frame.

The support frame 50 is connected to the pivot axle 40 and is rotatably supported by the pivot axle 40 with respect to the main support structure 30 to allow for rotation of the support frame 50 as illustrated in FIGS. 11 and 12 of the drawings. The support frame 50 may be comprised of various structure capable of supporting the telescoping supports such as a U-shaped bracket or box-type structure.

F. Telescoping Supports.

Figure 9:
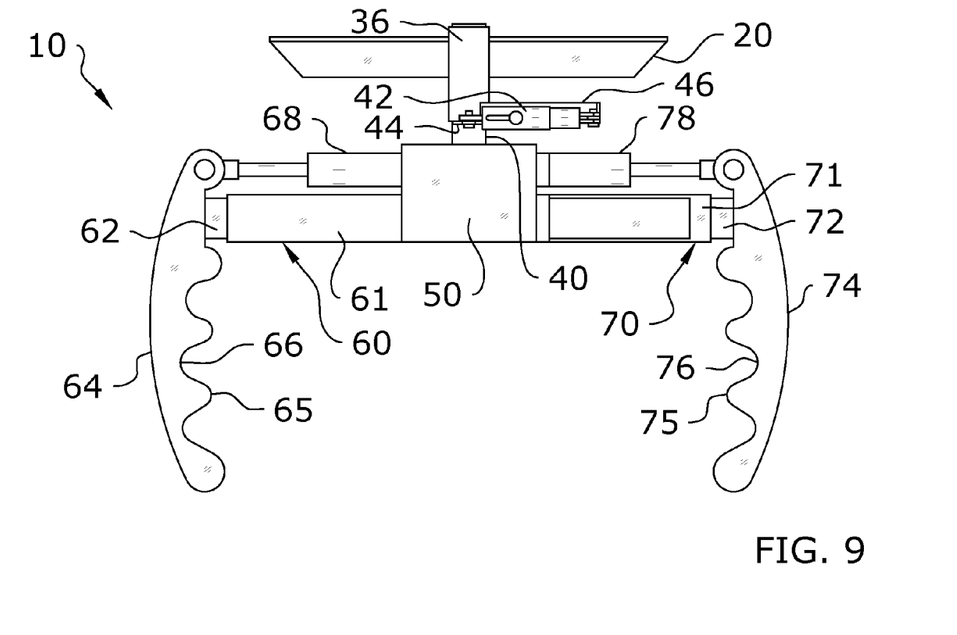
FIG. 9 is a top view of the present invention.
Figure 10:
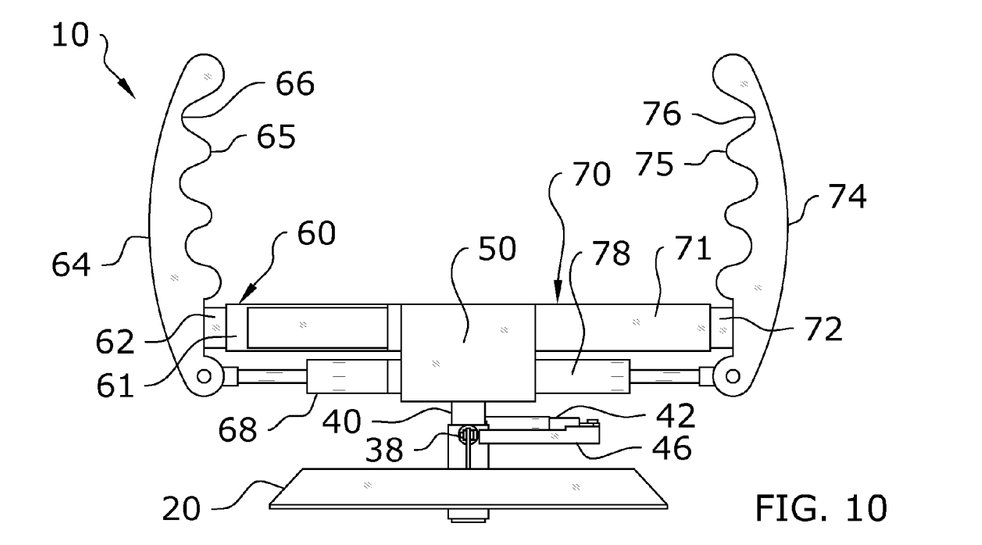
FIG. 10 is a bottom view of the present invention.

The first telescoping support 60 is attached to the support frame 50 extending in a first direction as illustrated in FIGS. 2, 3, 4, 5, 9, 10 of the drawings. The first telescoping support 60 is comprised of a structure capable of extending outwardly and retracting inwardly to move a corresponding first gripping member 64 to selectively release and secure a tire 11. The first telescoping support 60 is preferably comprised of a telescopic structure having at least a first inner portion 61 attached to the support frame 50 and a first outer portion 62 slidably connected to the first inner portion 61 as further illustrated in FIGS. 2, 3, 4, 5, 9, 10 of the drawings. The first gripping member 64 is attached to the distal end of the first outer portion 62 of the first telescoping support 60 and extends substantially transversely with respect to the first telescoping support 60 as best illustrated in FIGS. 9 and 10 of the drawings.

A first actuator 68 is connected to the first outer portion 62 and is adapted to extend or retract the first outer portion 62 with respect to the first inner portion 61. The first actuator 68 is connected to the support frame 50 or the first inner portion 61 opposite of the first outer portion 62. The first actuator 68 is preferably substantially parallel with respect to the first telescoping support 60. The first actuator 68 may be comprised of any type of linear actuator such as, but not limited to, mechanical actuators, hydraulic actuators, electro-mechanical actuators and the like.

The second telescoping support 70 is attached to the support frame 50 extending in a second direction which is opposite of the first direction for the first telescoping support 60 as illustrated in FIGS. 2, 3, 4, 5, 9, 10 of the drawings. The first telescoping support 60 is preferably substantially parallel with respect to the second telescoping support 70.

The second telescoping support 70 is comprised of a structure capable of extending outwardly and retracting inwardly to move a corresponding second gripping member 74 to selectively release and secure a tire 11. The second telescoping support 70 is preferably comprised of a telescopic structure having at least a second inner portion 71 attached to the support frame 50 and a second outer portion 72 slidably connected to the second inner portion 71 as further illustrated in FIGS. 2, 3, 4, 5, 9, 10 of the drawings. The second gripping member 74 is attached to the distal end of the second outer portion 72 of the second telescoping support 70 and extends substantially transversely with respect to the second telescoping support 70 as best illustrated in FIGS. 9 and 10 of the drawings.

Figure 13:
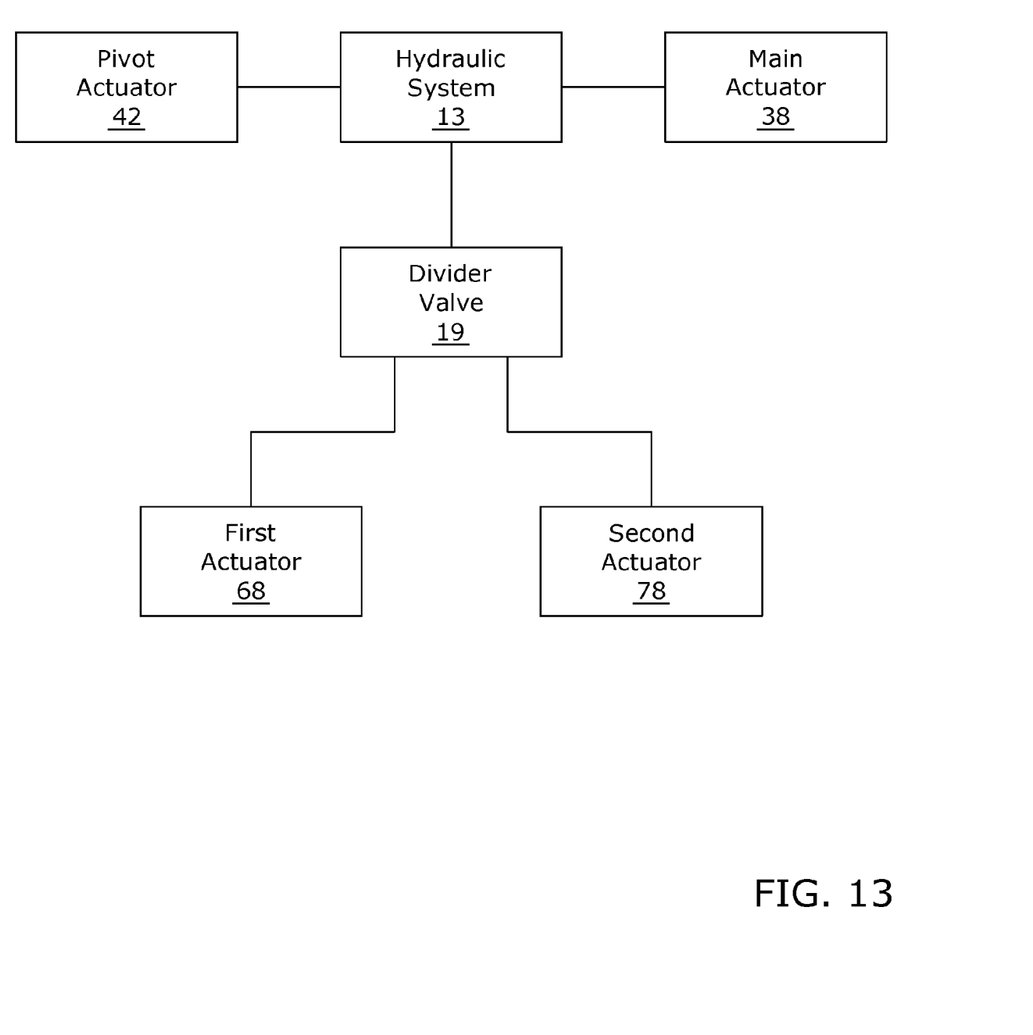
FIG. 13 is a block diagram illustrating the hydraulic fluid connections between the actuators and the hydraulic system of a tractor.

A second actuator 78 is connected to the second outer portion 72 and is adapted to extend or retract the second outer portion 72 with respect to the second inner portion 71. The second actuator 78 is connected to the support frame 50 or the second inner portion 71 opposite of the second outer portion 72. The second actuator 78 is preferably substantially parallel with respect to the second telescoping support 70. The second actuator 78 may be comprised of any type of linear actuator such as, but not limited to, mechanical actuators, hydraulic actuators, electro-mechanical actuators and the like. It is preferable to use a divider valve fluidly connected to the hydraulic system 13 of the tractor 12 to evenly control the flow of pressurized hydraulic fluid to the first actuator 68 and the second actuator 78 to achieve the same distance of extension and retraction of the telescopic supports 60, 70. The pivot actuator 42 and the main actuator 38 are further preferably connected to the hydraulic system 13 of the tractor 12 as illustrated in FIG. 13 of the drawings.

G. Gripping Members.

A first gripping member 64 is attached to the first telescoping support 60 and a second gripping member 74 is attached to the second telescoping support 70 opposite of the first gripping member 64. The first gripping member 64 and the second gripping member 74 preferably mirror one another and are in opposition to one another to grip a tire 11 between the gripping members 64, 74. The gripping members 64, 74 form a substantially U-shaped structure with the telescoping supports 60, 70 that selectively contracts and expands as best illustrated in FIGS. 9 and 10 of the drawings.

Figure 6:
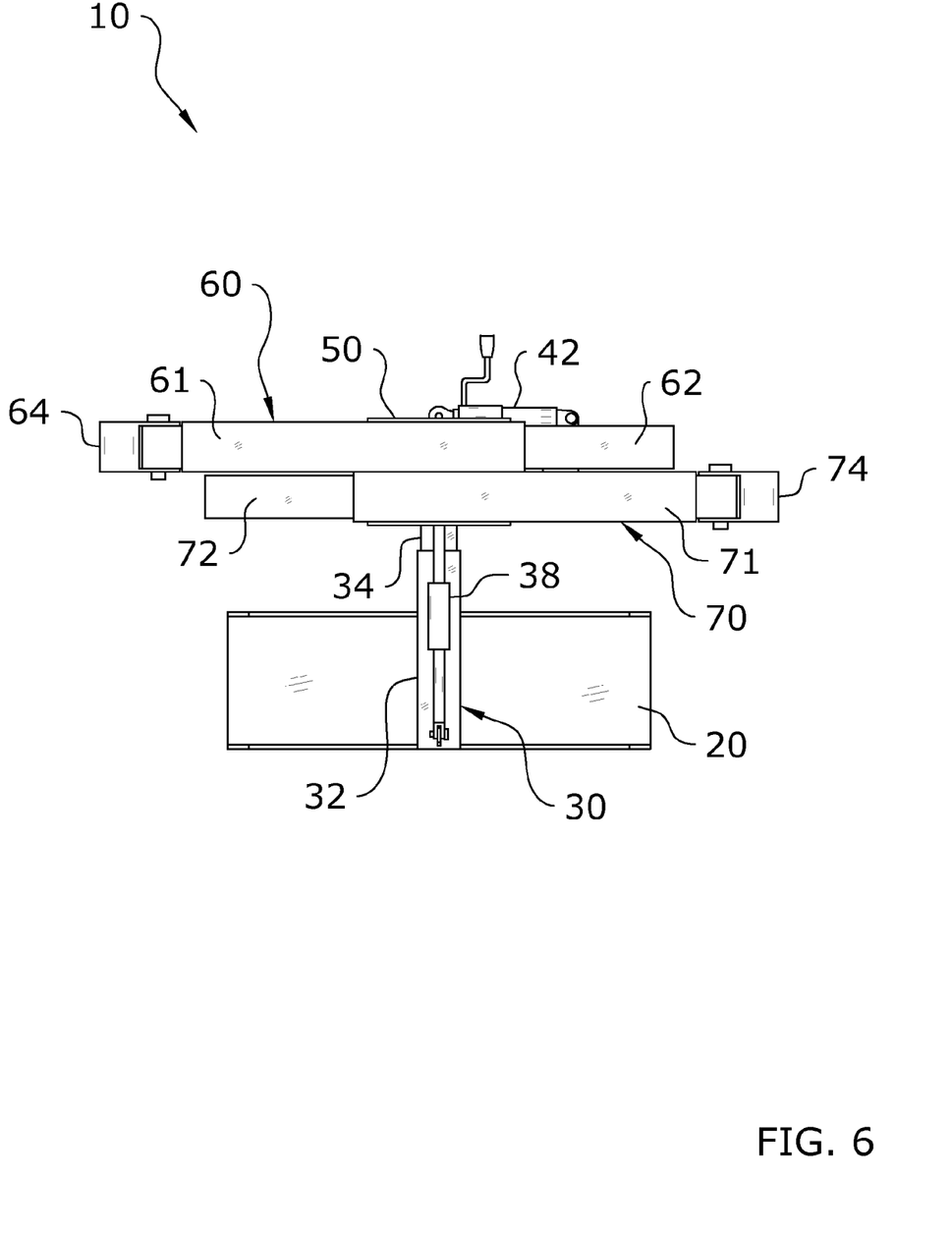
FIG. 6 is a rear view of the present invention.

The first gripping member 64 is adapted to engage a first side of a tire 11 and the second gripping member 74 is adapted to engage a second side of the tire 11 opposite of the first side of the tire 11 as illustrated in FIGS. 1*a* through 1*e* of the drawings. The first gripping member 64 and the second gripping member 74 extend forwardly and away from the mounting device 20 and the support frame 50 to selectively engage a tire 11. The first gripping member 64 and the second gripping member 74 are substantially parallel with respect to one another to provide secure gripping of the opposing sides of the tire 11. The first gripping member 64 and the second gripping member 74 are both preferably substantially transverse with respect to the first telescoping support 60 and the second telescoping support 70 as further shown in FIGS. 9 and 10 of the drawings. The gripping members 64, 74 do not have to be on the same plane as they can be offset slightly as illustrated in FIG. 6 of the drawings.

The gripping members 64, 74 each include an inner portion that faces the opposite inner portion. The inner portion may have a straight structure or a slightly inwardly curved structure. The first gripping member 64 and the second gripping member 74 each preferably include a plurality of jaws 65, 75 that extend inwardly. The first gripping member 64 and the second gripping member 74 each preferably include a plurality of recessed portions 66, 76 between the plurality of jaws 65, 75. The plurality of jaws 65, 75 are preferably constructed of a convex rounded structure to avoid damage to the tire 11 being manipulated. The plurality of recessed portions 66, 76 are preferably constructed of a concave configuration as shown in FIGS. 9 and 10 of the drawings. As illustrated in FIGS. 2, 3, 4, 5, 7 and 8 of the drawings, it is preferable that the gripping members 64, 74 each include two vertically spaced apart rows of jaws 65, 75 and recessed portions 66, 76.

H. Operation of Preferred Embodiment.

In use, the user connects the invention to a tractor 12 such as a skid steer loader by connecting the loader arms 14 to the mounting device 20. The user then adjusts the pitch of the invention utilizing the loader arms 14 and connecting structure on the loader arms 14 using the hydraulic system 13 of the tractor 12.

Figure 1A:
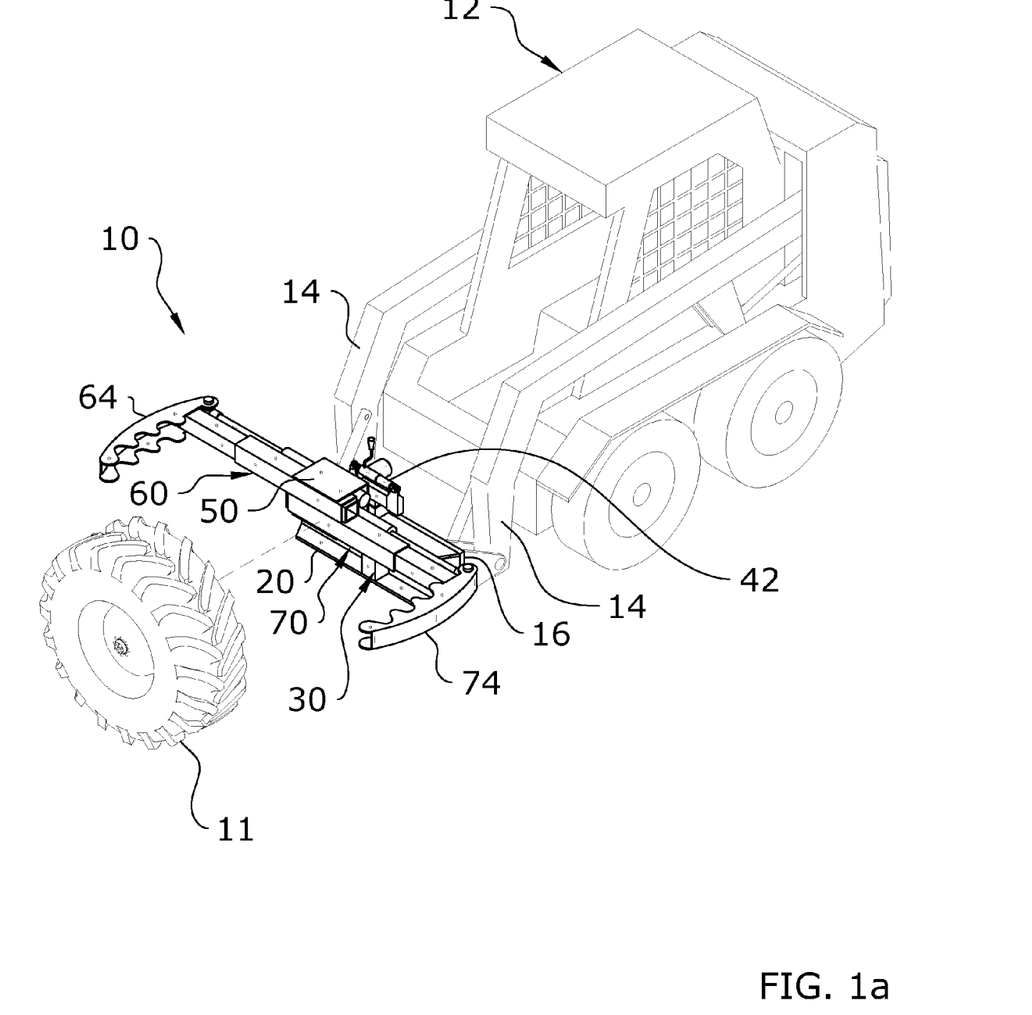
FIG. 1a is an upper perspective view of the present invention attached to a skid steer tractor with the gripping members extended.
Figure 1B:
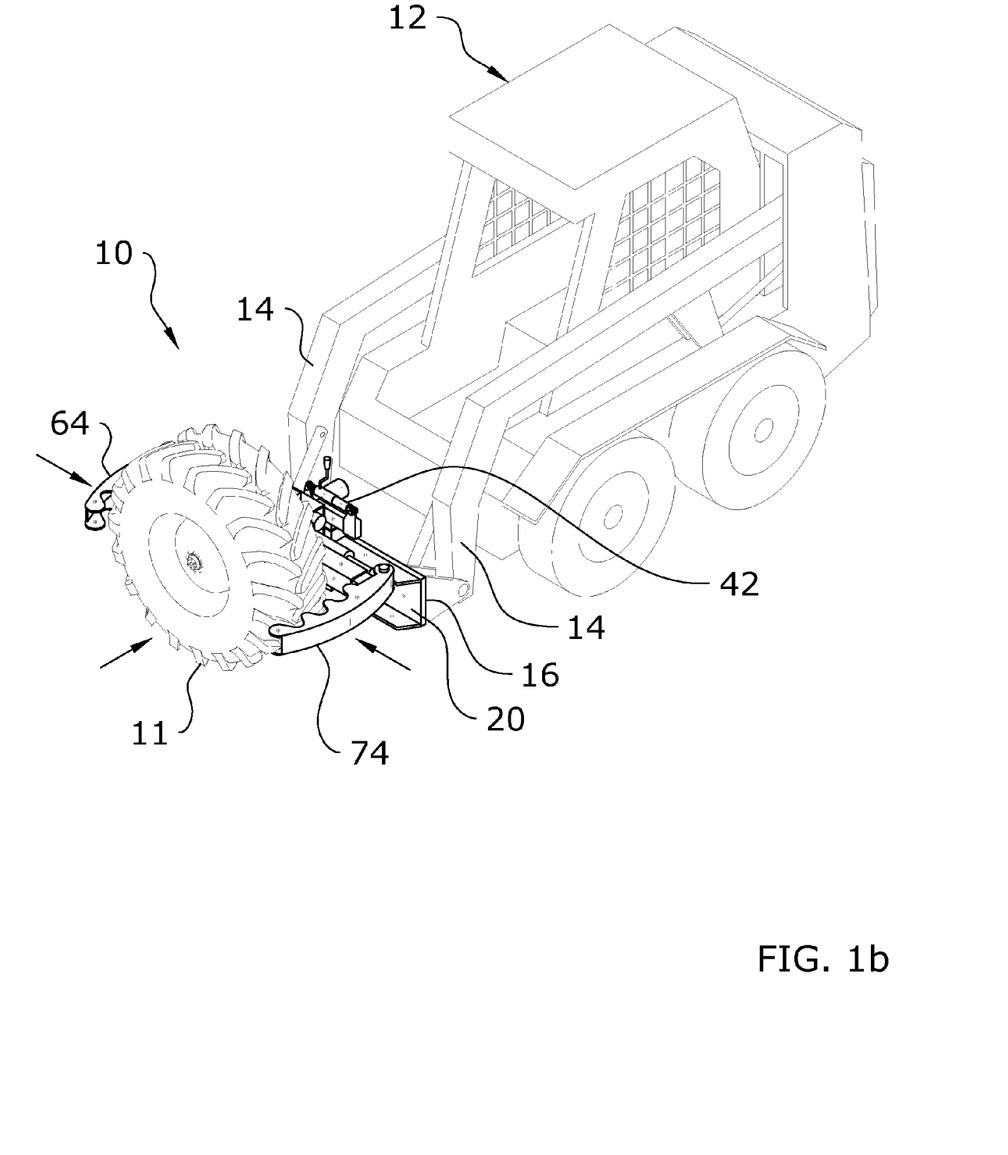
FIG. 1b is an upper perspective view of the present invention engaging the tire.
Figure 1C:
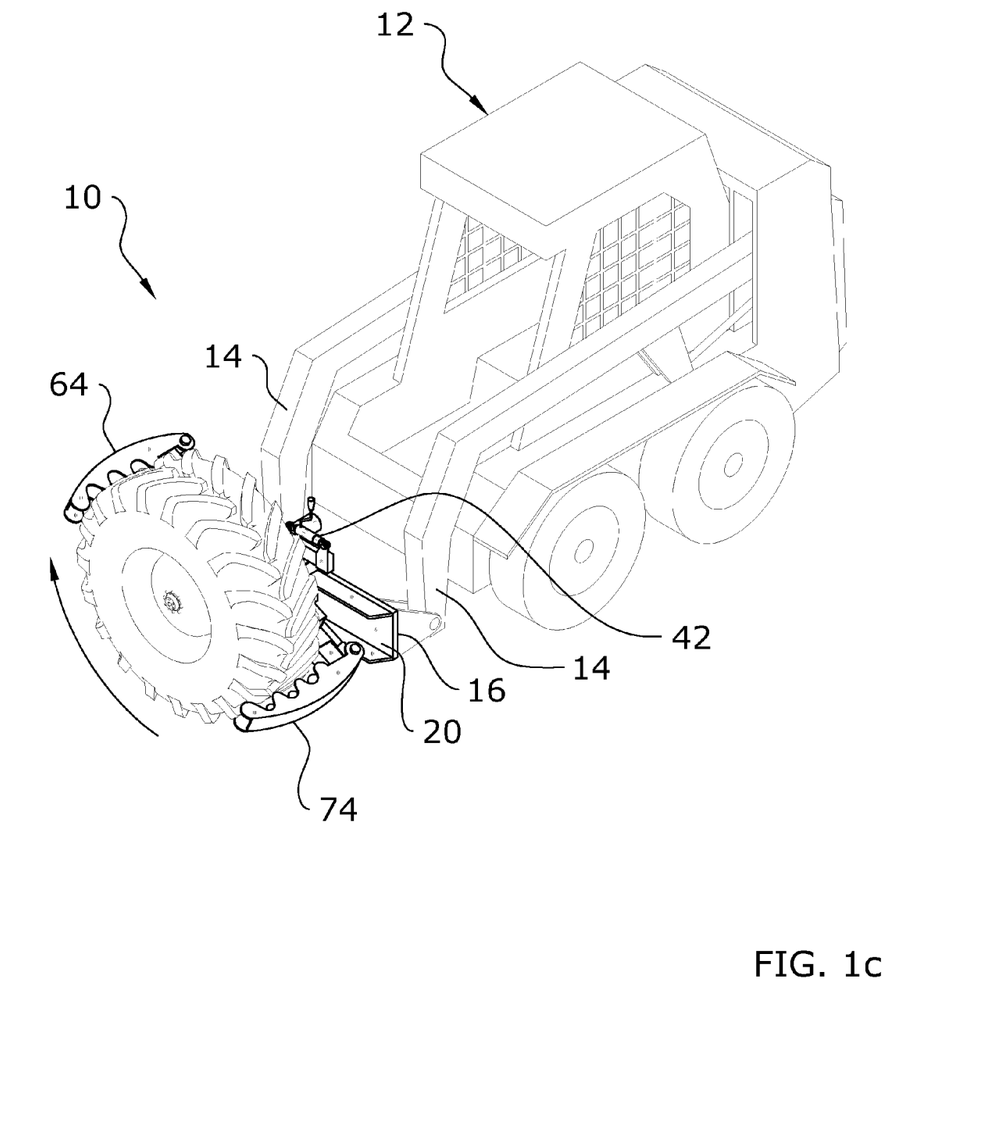
FIG. 1c is an upper perspective view of the present invention rotating the tire.
Figure 1D:
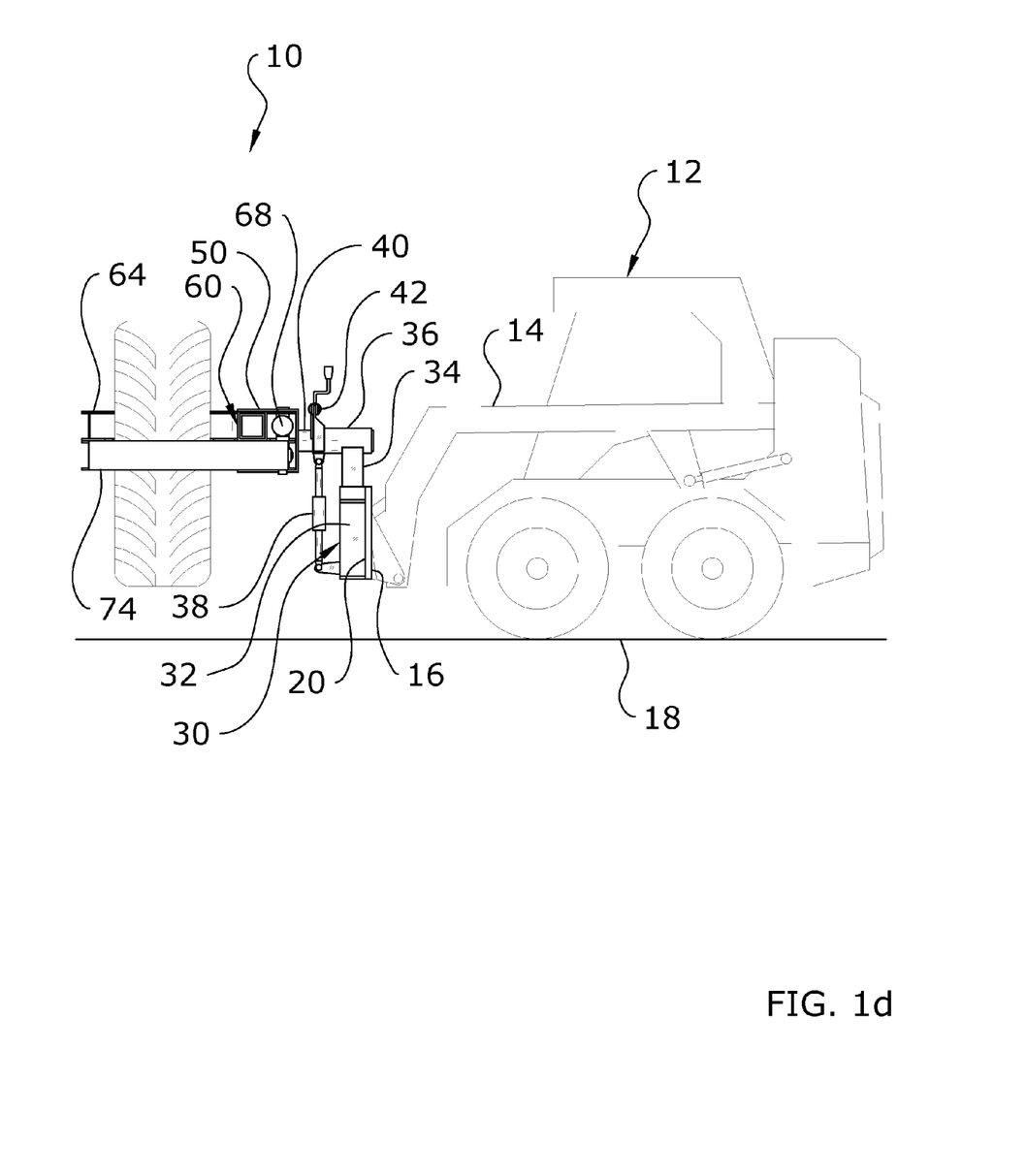
FIG. 1d is a side view of the present invention attached to a skid steer tractor and supporting a tire above a floor.
Figure 1E:
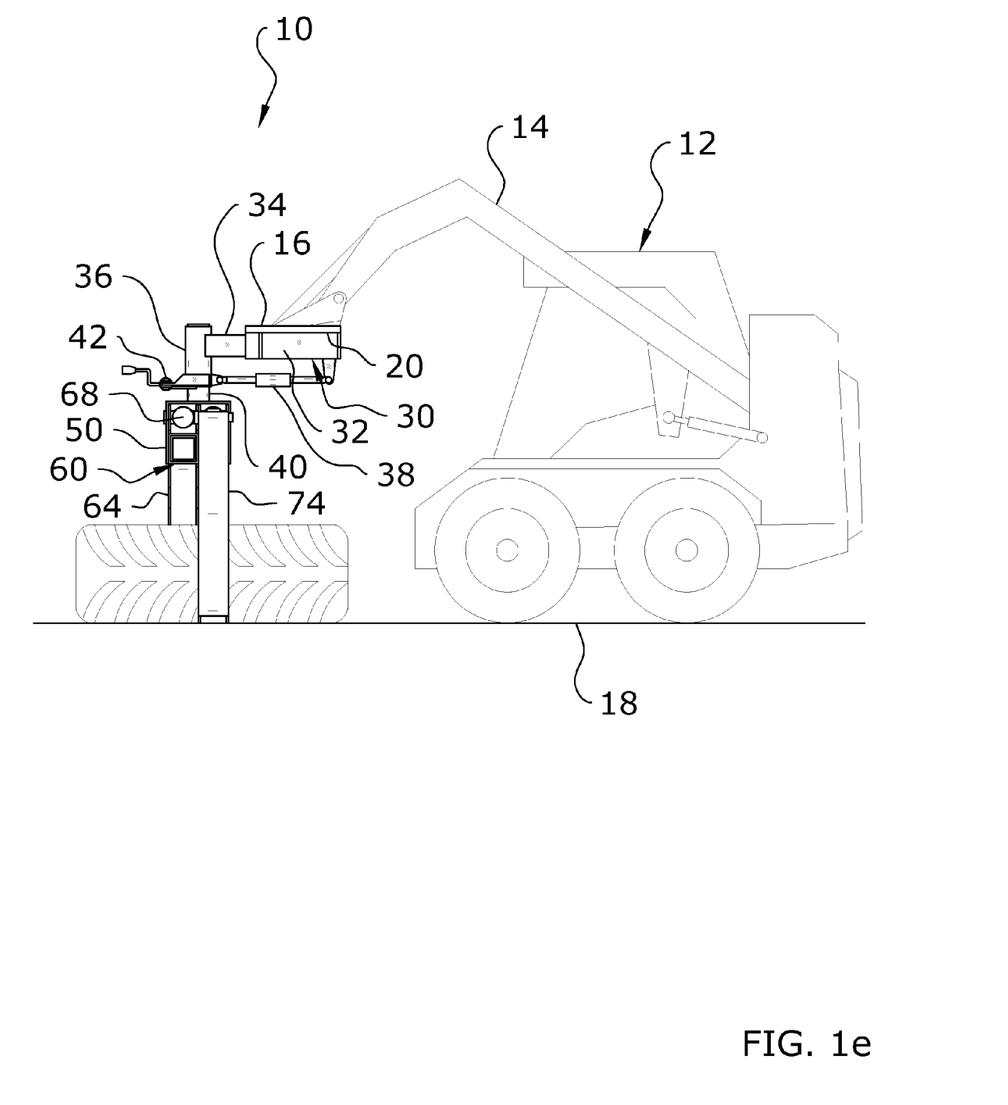
FIG. 1e is a side view of the present invention rotated approximately 90 degrees to pick up a tire lying flat on the floor.

If the user needs to pick up a tire 11 that is lying flat on the floor 18 as illustrated in FIG. 1*e* of the drawings, the user adjusts the pitch of the invention forwardly, extends the gripping members 64, 74 outwardly outside of the tire 11, positions the gripping members 64, 74 centrally above the tire 11 and then lowers the loader arms 14 to lower the gripping members 64, 74 about the outside of the tire 11. The user then activates the first actuator 68 and the second actuator 78 to contract the gripping members 64, 74 towards one another until the gripping members 64, 74 have fully gripped the tire 11. The user then is able to lift the tire 11 by elevating the loader arms 14 and then the user is able to transport the tire 11 to a desired location. If the user desires to mount the tire 11 on a vehicle, the user then pitches the invention rearwardly until the tire 11 is substantially vertically orientated as illustrated in FIG. 1*b* of the drawings. The user then drives the tractor 12 to position the tire 11 near the hub. The user activates the pivot actuator 42 to adjust the rotational position of the tire 11 with respect to the hub to align the mounting fasteners of the hub with the holes in the rim of the tire 11 as illustrated in FIG. 1*c* of the drawings. Once the holes of the rim of the tire 11 are properly aligned, the user moves the tire 11 forwardly until the threaded mounting fasteners are fully extended through the holes in the rim. The user is then able to secure the lug nuts to the mounting fasteners and then release the gripping members 64, 74 from the tire 11. A similar process may be used to remove a tire 11 from a vehicle as illustrated in FIG. 1*a* of the drawings.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A tire manipulation system, comprising:
 a mounting device adapted for removable attachment to a tractor;

a main support structure attached to said mounting device;
a pivot axle rotatably connected to said main support structure;
wherein said main support structure is comprised of a telescopic structure for lowering and raising said pivot axle;
a support frame connected to said pivot axle, wherein said support frame is rotatably supported by said pivot axle with respect to said main support structure;
a first telescoping support attached to said support frame extending in a first direction;
a first gripping member attached to said first telescoping support, wherein said first gripping member is adapted to engage a first side of a tire;
a second telescoping support attached to said support frame extending in a second direction; and
a second gripping member attached to said second telescoping support, wherein said second gripping member is adapted to engage a second side of the tire opposite of the first side of the tire.

2. The tire manipulation system of claim 1, including a main actuator connected to said main support structure to extend or retract said main support structure.

3. The tire manipulation system of claim 1, wherein said main support structure is comprised of a lower support attached to said mounting device and an upper support slidably connected to said lower support, wherein said pivot axle is connected to said upper support.

4. The tire manipulation system of claim 1, wherein said pivot axle has a pivot axis that is substantially perpendicular to said mounting device.

5. The tire manipulation system of claim 1, wherein said first direction is opposite of said second direction.

6. The tire manipulation system of claim 1, wherein said first gripping member and said second gripping member extend away from said mounting device.

7. The tire manipulation system of claim 6, wherein said first gripping member and said second gripping member are substantially parallel with respect to one another.

8. The tire manipulation system of claim 7, wherein said first gripping member and said second gripping member are both substantially transverse with respect to said first telescoping support and said second telescoping support.

9. The tire manipulation system of claim 8, wherein said first telescoping support is substantially parallel with respect to said second telescoping support.

10. The tire manipulation system of claim 1, wherein said first gripping member and said second gripping member each include a plurality of jaws that extend inwardly.

11. The tire manipulation system of claim 10, wherein said first gripping member and said second gripping member each include a plurality of recessed portions between said plurality of jaws.

12. The tire manipulation system of claim 11, wherein said plurality of jaws are comprised of a rounded structure.

13. The tire manipulation system of claim 1, including a pivot actuator connected to said pivot axle, wherein said pivot actuator rotates said pivot axle with respect to said main support structure.

14. The tire manipulation system of claim 13, including a pivot frame extending from said main support structure and a pivot arm connected to said pivot axle, wherein said pivot actuator is connected between said pivot frame and said pivot arm.

15. The tire manipulation system of claim 1, wherein said mounting device is comprised of a quick attach mounting plate for a skid steer tractor.

16. The tire manipulation system of claim 1, wherein said first telescoping support is comprised of a first inner portion attached to said support frame, a first outer portion slidably connected to said first inner portion, wherein said first gripping member is attached to said first outer portion, and a first actuator connected to said first outer portion, wherein said first actuator is adapted to extend or retract said first outer portion with respect to said first inner portion.

17. The tire manipulation system of claim 16, wherein said second telescoping support is comprised of a second inner portion attached to said support frame, a second outer portion slidably connected to said second inner portion, wherein said second gripping member is attached to said second outer portion, and a second actuator connected to said second outer portion, wherein said second actuator is adapted to extend or retract said second outer portion with respect to said second inner portion.

18. A tire manipulation system, comprising:
a mounting device adapted for removable attachment to a tractor;
a main support structure attached to said mounting device;
a pivot axle rotatably connected to said main support structure;
a support frame connected to said pivot axle, wherein said support frame is rotatably supported by said pivot axle with respect to said main support structure;
a first telescoping support attached to said support frame extending in a first direction;
a first gripping member attached to said first telescoping support, wherein said first gripping member is adapted to engage a first side of a tire;
a second telescoping support attached to said support frame extending in a second direction;
a second gripping member attached to said second telescoping support, wherein said second gripping member is adapted to engage a second side of the tire opposite of the first side of the tire;
a pivot actuator connected to said pivot axle, wherein said pivot actuator rotates said pivot axle with respect to said main support structure; and
a pivot frame extending from said main support structure and a pivot arm connected to said pivot axle, wherein said pivot actuator is connected between said pivot frame and said pivot arm.

* * * * *